United States Patent

Hoffmaster et al.

[15] 3,649,107
[45] Mar. 14, 1972

[54] ADJUSTABLE TEMPLES FOR SPECTACLES

[72] Inventors: George R. Hoffmaster; Jack M. Prins, both of Reading, Pa.

[73] Assignee: ESB Incorporated, Philadelphia, Pa.

[22] Filed: Apr. 13, 1970

[21] Appl. No.: 27,778

[52] U.S. Cl. .......................................351/118, 387/58 CT
[51] Int. Cl. .......................................................G02c 5/20
[58] Field of Search ...............351/118, 111, 140; 287/58 CT

[56] References Cited

UNITED STATES PATENTS 3,318,654  5/1967  Kreuzberger et al. ..................351/118
3,510,208  5/1970  Watkins..................................351/118

Primary Examiner—David Schonberg
Assistant Examiner—John W. Leonard
Attorney—William J. Ruano

[57] ABSTRACT

The invention relates to means for adjusting the length of spectacle temples. The forward portion of each temple is of rectangular tubular construction into which portion the rear portion of the temple is adapted to slide to selective positions held by a short spring anchored intermediate said forward portion. The spring engages selective spaced slots of the rear portion. A window is provided on the forward portion to view a scale on the rear portion which indicates the overall length of the spectacle temples.

1 Claim, 5 Drawing Figures

Patented March 14, 1972 3,649,107

INVENTORS
GEORGE R. HOFFMASTER
JACK M. PRINS
by
William J. Ruano
their ATTORNEY

ADJUSTABLE TEMPLES FOR SPECTACLES

This invention relates to spectacles and the like, such as industrial spectacles, sunglasses, or ordinary glasses, and, more particularly, it relates to means for adjusting the lengths of the temples of such spectacles.

An outstanding disadvantage of temples of adjustable length as used in the past is that they are generally complicated in construction and require numerous or substantial parts which add materially to the cost.

Another disadvantage is that a long leaf spring is generally provided having a forward end anchored to the hinge plate adjacent the frame, which spring is under constant tension as the result of which fatigue sets in which decreases the degree of tension and effectiveness of the spring. As the result of this, the relatively slidable parts are no longer securely held together at the adjusted position.

Another disadvantage of adjustable temple constructions known in the art is that no fool proof means are provided for easily and quickly denoting the adjusted length of the temples to suit a particular wearer.

An object of the present invention is to provide a novel adjustable means for adjusting the length of temples for spectacles and the like, which means is devoid of the above-named disadvantages.

A more specific object of the invention is to provide spectacle temples of adjustable length involving a minimum number of very simple and inexpensive parts which greatly reduce the overall cost of manufacture.

Another specific object is to provide a separate leaf spring of very short length for holding the temple portions at the desired adjusted position without the danger of loosening since the spring is not normally under tension and is not anchored to the hinge between the temple and frame.

Another object of the invention is to provide a novel arrangement of a scale and window in the respective relatively slidable portions of the temple so as to make reading of the scale extremely easy by a window opening in the front tubular portion of the temple.

Other objects and advantages will become more apparent from a study of the following description taken with the accompanying drawing wherein.

Figure 1:
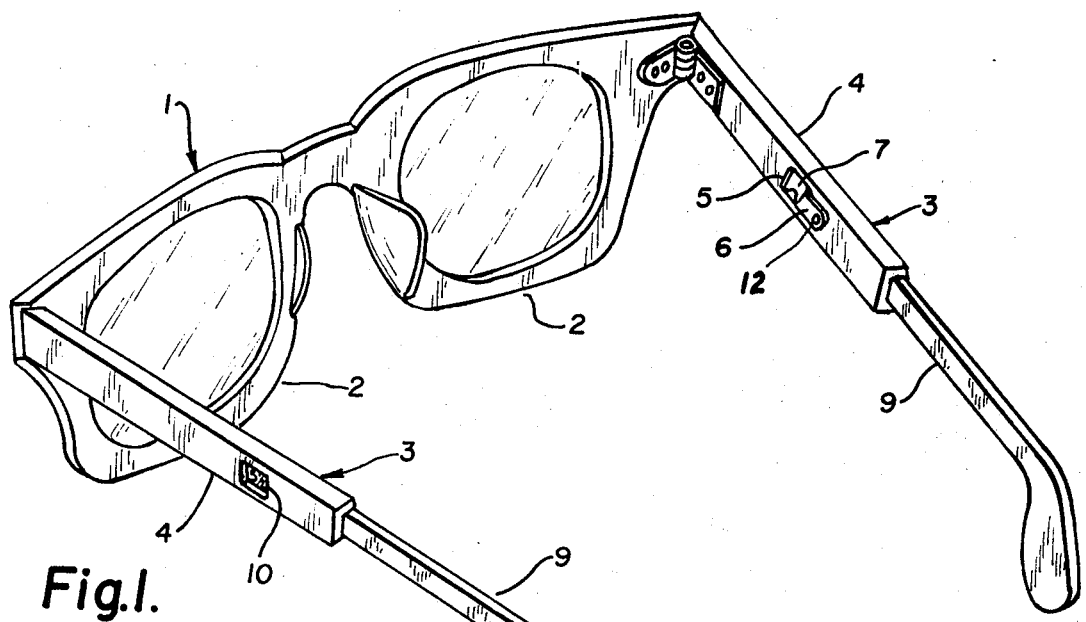
FIG. 1 is a top perspective view of a pair of spectacles embodying temples of adjustable length in accordance with the present invention,—the dot dash outline showing an extended position of the rear portion 9 of one of the temples.

Referring more particularly to FIG. 1 of the drawing, numeral 1 generally denotes a front frame portion having hinged thereto temples of adjustable length, generally denoted by numeral 3. The front temple portions 4 are in the form of rectangular tubes, preferably of plastic material, such as transparent plastic. On the inner side of each of the tubes 4 facing the wearer, there is rigidly mounted a short spring 6 having a hooked end portion 7 which projects through a small opening 5 provided on the inner side of tube 4, as shown more clearly in FIGS. 4 and 5.

Figure 2:
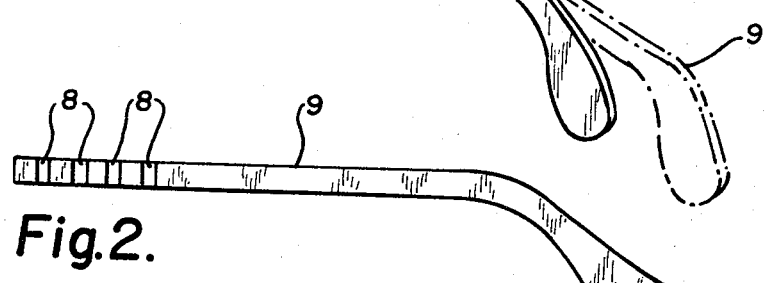
FIG. 2 is a plan view of the other of the temple rear portions when removed from the front portion.
Figure 4:
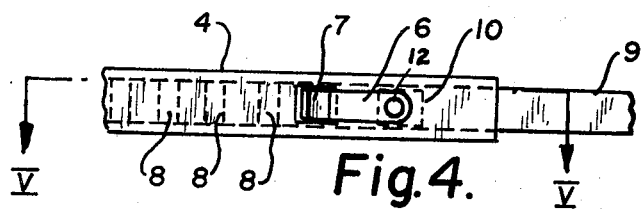
FIG. 4 is an enlarged, fragmentary, elevational view of said other temple showing the front and rear temple portions in telescoping relationship; and, FIG. 5 is a longitudinal, cross-sectional view taken along line V—V of FIG. 4.
Figure 5:
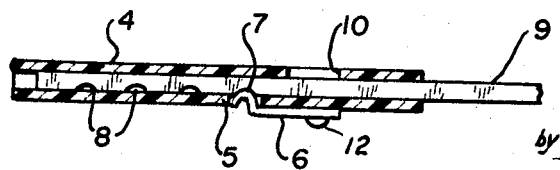

As shown more clearly in FIGS. 2, 4 and 5, each temple rear portion 9 has, on its inner side, a plurality of spaced, vertical slots or grooves 8 of curved outline, as best shown in FIG. 5, into which the hooked end of spring 6 snugly fits. Spring 6 is not under tension while seated in a groove 8, therefore its springiness does not decrease as it would if it were under constant tension.

Figure 3:
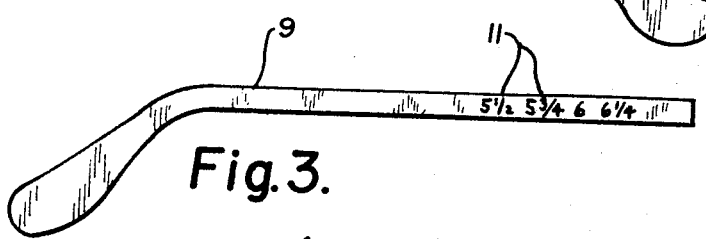
FIG. 3 is an elevational view showing the opposite side of temple portion 9 shown in FIG. 2.

As shown in FIG. 3, a scale 11 is provided on the outer side of each rear temple portion. A rivet or other fastener 12 anchors the rearward end of leaf spring 6 to tube 4. In order to enable mounting of such rivet, a small access hole 10 is provided on the opposite side of the tube. A unique feature of the present invention is that such access hole 10 is so shaped as to serve a dual function, namely to provide access to the inner surface of the tube to introduce a backup element while rivet 12 is being riveted,—also to provide a window for scale 11 to enable easy and quick viewing of the particular size or overall length of the temple by completely surrounding one of the numerals of scale 11. Moreover, the window is advantageously placed on the outer side to enable easy adjustment either by the wearer or a professional fitter.

Since only a small hole or window 11 is provided in the front tubular portion 4, which is substantially covered by spring 6, industrial dust and fumes are excluded from the interior and the appearance of the spectacles is not marred by exposure of the temple adjusting means as occurs in well known types of adjustable temples. Instead, the appearance is that of temples of fixed length.

In operation, when it is desired to increase or shorten the overall length of the temples 3, the rear portions 9 are either pulled outwardly or pushed inwardly of the front tubular portions 3 so that the hooked end portions 7 of the springs are selectively seated in the selected slots 8. If the wearer knows his particular size, he will view scale 11 through window 10 and adjust the length to provide such size.

Thus it will be seen that we have provided an efficient means for adjusting the length of spectacle temples, which means involves a minimum number of simple parts which greatly reduce manufacturing costs and which are so arranged as not to mar the appearance of the spectacles, and including a scale designed so that the overall size of the adjusted temple may be easily and quickly observed visually either by the wearer or a professional fitter, such as an optician.

While we have illustrated and described a single specific embodiment of our invention, it will be understood that this is by way of illustration only and that various changes and modifications may be made within the contemplation of our invention and within the scope of the following claims.

We claim:

1. In a pair of spectacles having a front frame and temples hinged thereto, means for selectively adjusting the length of each of said temples comprising a front tubular temple portion having a small hole on the inner side facing the wearer, a short leaf spring, fastening means anchoring one end of said spring to the inner side of said front tubular temple portion immediately adjacent to said hole, said fastening means being a rivet and each said front tubular temple portion having a window opening directly opposite said rivet to enable fastening of said rivet to said inner side, said spring having a hooked portion at the other end extending into said small hole and covering substantially the entire opening of said hole, a rear temple portion slidably fitted inside said front tubular portion and having spaced vertical grooves on the inner side thereof into which said hooked portion of the spring is selectively seated normally without tensioning said spring and which is tensioned only while outside of said grooves while adjusting the overall length of the temple, each of the rear portions of the temple having a scale on the outer side visible through said window opening which encloses the respective size numbers of said scale.

* * * * *